Patented July 23, 1940

2,208,915

UNITED STATES PATENT OFFICE 2,208,915

PROCESS FOR PREPARING REDUCTION PRODUCTS OF ETHERIFIED ESTRONE

Rezsö Weisz, Budapest, Hungary, assignor to the firm Chinoin Gyogyszer es Vegyeszeti Termekek Gyara R. T., Dr. Kereszty and Dr. Wolf, Ujpest, Hungary, a corporation of Hungary No Drawing. Application April 26, 1938, Serial No. 204,391. In Hungary May 29, 1937

6 Claims. (Cl. 260—397)

I found, that estrone derivatives obtained by introducing by means of usual benzylating methods a benzyl or a substituted benzyl group into the phenolhydroxyl of the estrone are readily crystallising compounds and are therefore suitable for separating the estrone from crude or partly prepurified hormone extracts. On the other hand, they are useful starting materials for the production of, partly known, partly new, valuable reduction products.

Thus e. g. estrone etherified by a benzyl or substituted benzyl group, if reduced by reducing metal compounds generally used for converting carbonyl groups into secondary alcohol groups, yields estradiol etherified in the hydroxyl on the carbon atom 3, by a benzyl or substituted benzyl group. The estradiol-3-benzyl ethers, thus obtained, are valuable starting materials. On the one hand, they are apt to be acylated in the hydroxyl on the carbon atom 17. On the other hand, they can be transformed into estradiol by splitting off the benzyl or substituted benzyl group by methods generally used for this purpose.

For converting the carbonyl group into a secondary hydroxyl group the aluminium alkoxides, such as e. g. aluminium isopropylate, proved to be particularly useful. However, also hydrosulphites, such as e. g. sodium hydrosulphite, can be used.

If the eliminating of the benzyl or substituted benzyl group is aimed at, the estradiol benzyl ether is submitted to a second reduction. For this purpose a catalytic hydrogenation (palladium) or a reduction by sodium in alcoholic medium are specially suitable. Treatment by hydrolising agent, f. i. by aqueous hydrochloric acid, can be also used for the same purpose.

The conversion of the carbonyl group into a secondary alcohol group can also be performed simultaneously with the removal of the benzyl or substituted benzyl group.

Examples (1) 1 g. of estrone benzyl ether (obtained from crude or prepurified estrone extracts or from pure estrone by benzylating by means of benzylchloride in presence of sodium ethylate, melting point 136° C.) is dissolved in isopropyl alcohol and heated with 12 g. aluminium isopropylate to 80–85° C. on a condenser set to distillation for 14 hours. Subsequently, diluted hydrochloric acid is added and the mixture extracted with benzene. The residue obtained by evaporation of the benzene solution yields on recrystallization from methyl alcohol estradiol 3-benzyl ether, M. P. 82–84°.

(2) One g. of estrone benzyl ether dissolved in 150 c. c. alcohol is boiled for 6 hours together with 10 gms. of sodium hydrosulphite, 150 c. c. of water and 13 c. c. of a 50 per cent sodium hydroxide solution. After the alcohol has been removed by distillation the residue is extracted with benzene. The resulting benzene solution is washed repeatedly with water and then freed from the benzene by evaporation. The residue may be directly recrystallised from methyl alcohol, yielding estradiol-3-benzyl ether of M. P. 82–84°; it may however be advisable first to remove from the raw benzene extract any unchanged estrone benzyl ether by ketone-reagents, e. g. by ethyl hydrazino-acetate.

(3) 0.3 g. of the estradiol 3-benzyl ether are heated into a sealed tube, with 7.5 c. c. of alcohol and 1.5 c. c. of concentrated hydrochloric acid for 8 hours in a boiling water-bath. Then the reaction mixture is diluted with water and extracted with ether. The separated ethereal solution is thoroughly extracted with solute sodium hydroxide solution; the separated aqueous layers are then acidified by hydrochloric acid and extracted by ether. The ethereal solution yields after evaporation estradiol. It melts, crystallised from alcohol and benzene, at 173–175.

(4) 0.3 g. of estradiol 3-benzyl ether are dissolved in glacial acetic acid and hydrogenated at room temperature using palladium as catalyst. After removing the palladium by filtration and evaporating the glacial acetic acid in vacuum, the residue is taken up in ether and extracted repeatedly with sodium hydroxide solution; the separated aqueous layers are then acidified by hydrochloric acid and extracted by ether. The ethereal solution yields, on evaporation and recrystallisation, estradiol of M. P. 173–175.

(5) A solution of 0.5 g. of estradiol 3-benzyl ether in 25 c. c. of alcohol is refluxed and 1.3 g. of metallic sodium is added in small portions; the heating is continued for 20–25 minutes. Subsequently the alcohol is evaporated the residue taken up in water and extracted with ether in order to remove eventually unchanged starting material. The separated aqueous layer is now acidified and extracted with ether. The ethereal solution thus obtained yields on evaporation crystalline estradiol.

What I claim is:

1. A process for producing reduction products of estrone benzyl ether, comprising the reduction of estrone benzyl ether by means of reducing metal compounds generally used for the conversion of carbonyl groups into secondary hydroxyl groups.

2. A process for producing reduction products of estrone benzyl ether comprising the reduction of estrone benzyl ether by means of aluminium alkoxides of secondary alcohols as reducing agents.

3. A process for producing reduction products of estrone benzyl ether comprising the reduction of estrone benzyl ether by means of alkali metal hydrosulphites as reducing agents.

4. A process for producing reduction products of estrone benzyl ether by means of reducing metal compounds generally used for the conversion of carbonyl groups into secondary hydroxyl groups, and splitting off the benzyl group from the estradiol-3-benzyl-ether obtained.

5. A process for producing reduction products of estrone benzyl ether comprising the reduction of estrone benzyl ether by means of reducing metal compounds generally used for the conversion of carbonyl groups into secondary hydroxyl groups, separating the resulting estradiol-3-benzyl-ether and splitting off the benzyl group by catalytic hydrogenation.

6. As a new product of manufacture, estradiol-3-benzyl-ether.

REZSÖ WEISZ.